Oct. 14, 1941.  V. S. SHAW ET AL  2,259,181
PLASTIC EXTRUSION PRESS
Filed June 25, 1936  5 Sheets-Sheet 1

Inventors
VICTOR S. SHAW,
WALTER ERNST,
BY
Toulmin & Toulmin
Attorneys

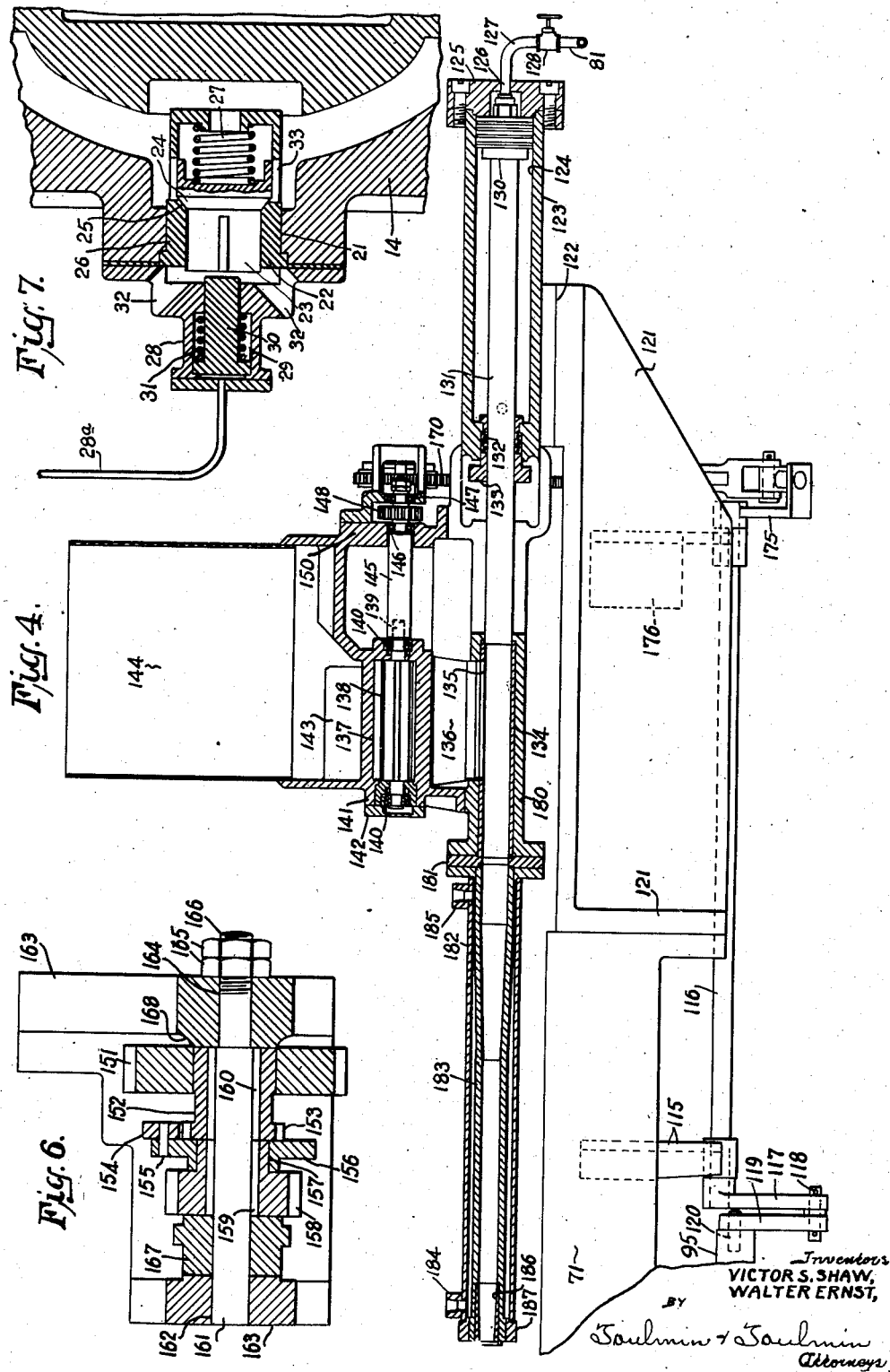

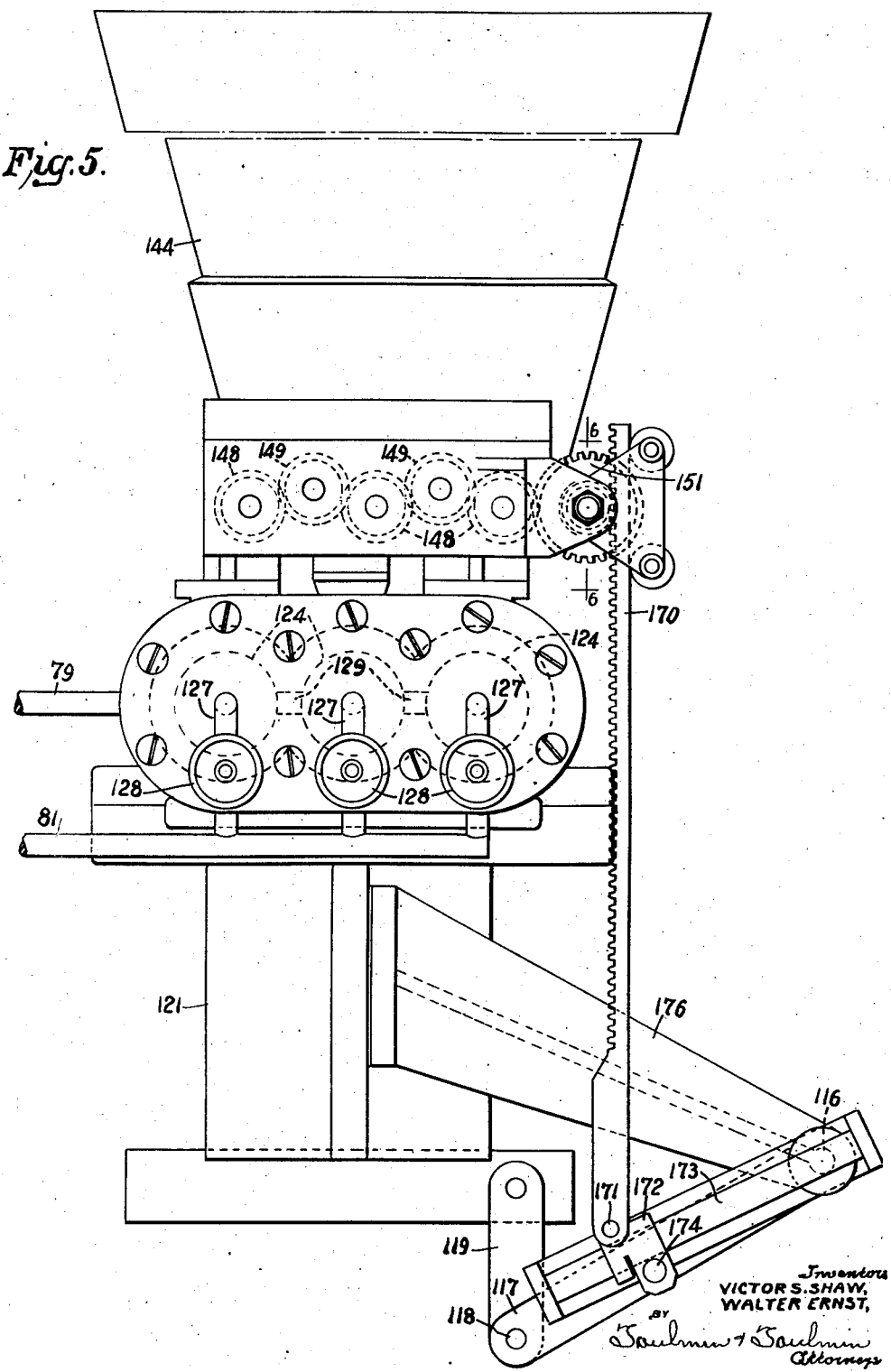

Patented Oct. 14, 1941

2,259,181

UNITED STATES PATENT OFFICE 2,259,181

PLASTIC EXTRUSION PRESS

Victor S. Shaw and Walter Ernst, Mount Gilead, Ohio, assignors to The Hydraulic Press Corporation, Inc., Wilmington, Del., a corporation of Delaware Application June 25, 1936, Serial No. 87,270

17 Claims. (Cl. 18—30)

This invention relates to hydraulic presses, and in particular, to molding presses with injection devices associated therewith.

One object of this invention is to provide an extrusion molding press in which means is provided for injecting the molding material at a plurality of points in the die, thereby enabling the successful molding of larger pieces or of pieces with varying sections.

Another object is to provide a vertical extrusion molding press, wherein the various plungers move vertically, thereby maintaining the die members in horizontal positions so that inserts may be conveniently used in the dies because by this arrangement they will tend to maintain their correct positions more accurately than in a horizontal type of press.

Another object is to provide an extrusion molding press, wherein the feeding devices for the plastic materials are attached to and move with the injection devices as they advance into engagement with the die, thereby eliminating the necessity for swing joints, flexible conduits or other arrangements for carrying the plastic materials between the feeding devices and the injection devices.

Another object is to provide a vertical extrusion molding press, wherein the injection devices are mounted upon a crosshead, to which the feeding devices are also attached, thereby causing the feeding devices and injection devices to move substantially as a unit, and thereby eliminate flexible or swinging connections, such connections being exposed to the danger of leakage and wear.

Another object is to provide an injection molding press of this type, wherein the crosshead for carrying the injection devices is provided with hydraulic rams for its actuation, these rams being bored so as to provide fluid conduits for the transmission of fluid from their respective cylinders to the feeding apparatus mounted upon the crosshead and moving as a unit with the injection devices, thereby eliminating flexible or universal connections for the transmission of the pressure fluid required to operate the feeding devices, these feeding devices being preferably actuated by the hydraulic rams.

Another object is to provide an extrusion molding press having a feeding device with a plurality of feeding chambers, these feeding chambers being movable relatively to one another so as to enable the feeding arrangement to be adapted to different sizes and shapes of dies.

Another object is to provide an extrusion molding press with a cross head having injection devices mounted thereon and double-acting rams to advance and retract this crosshead, one of these rams having a drilled passageway connecting the ram advancing chamber through the plunger to an external opening outside the cylinder, and the other ram having a similar passageway connecting the ram retracting chamber with an external opening outside its cylinder, these external openings being connected, respectively, to the advancing and retraction chambers of a hydraulic ram for operating the feeding devices mounted upon the cross head so as to eliminate flexible or universal connections for the transmission of fluid to the feeding ram.

Another object is to provide an extrusion molding press with the injection devices operated by a hydraulic ram, this injection ram having means associated therewith for varying the pressure which it applies to the injecting plungers without requiring a change in the pressure which the pump delivers to the ram.

Another object is to provide an extrusion molding press having a crosshead for carrying a plurality of injection devices employing injection plungers, which are in turn, connected to a plunger crosshead which is moved to and fro by an injection ram, means being provided to rearrange the injection devices and their plungers upon their respective crossheads so as to employ these devices with dies having the admission points for the plastic material arranged at different locations.

Another object is to provide an extrusion molding press and a hydraulic circuit therefor, with means for controlling the actuation of the clamping and injection rams, together with the feeding rams for the plastic material.

In the drawings:

Figure 4 is an enlarged central vertical section through the feeding assembly shown at the right-hand side of Figure 2.

Figure 5 is a right-hand end elevation of the feeding assembly shown in Figure 4.

Figure 6 is an enlarged vertical section along the line 6—6 in Figure 5, showing the ratchet-operating mechanism for the feeding members in the feeding assembly.

Figure 7 is an enlarged detail view of the surge valve used in the press and circuit of this invention.

*General construction of press and hydraulic circuit*

Figure 1:
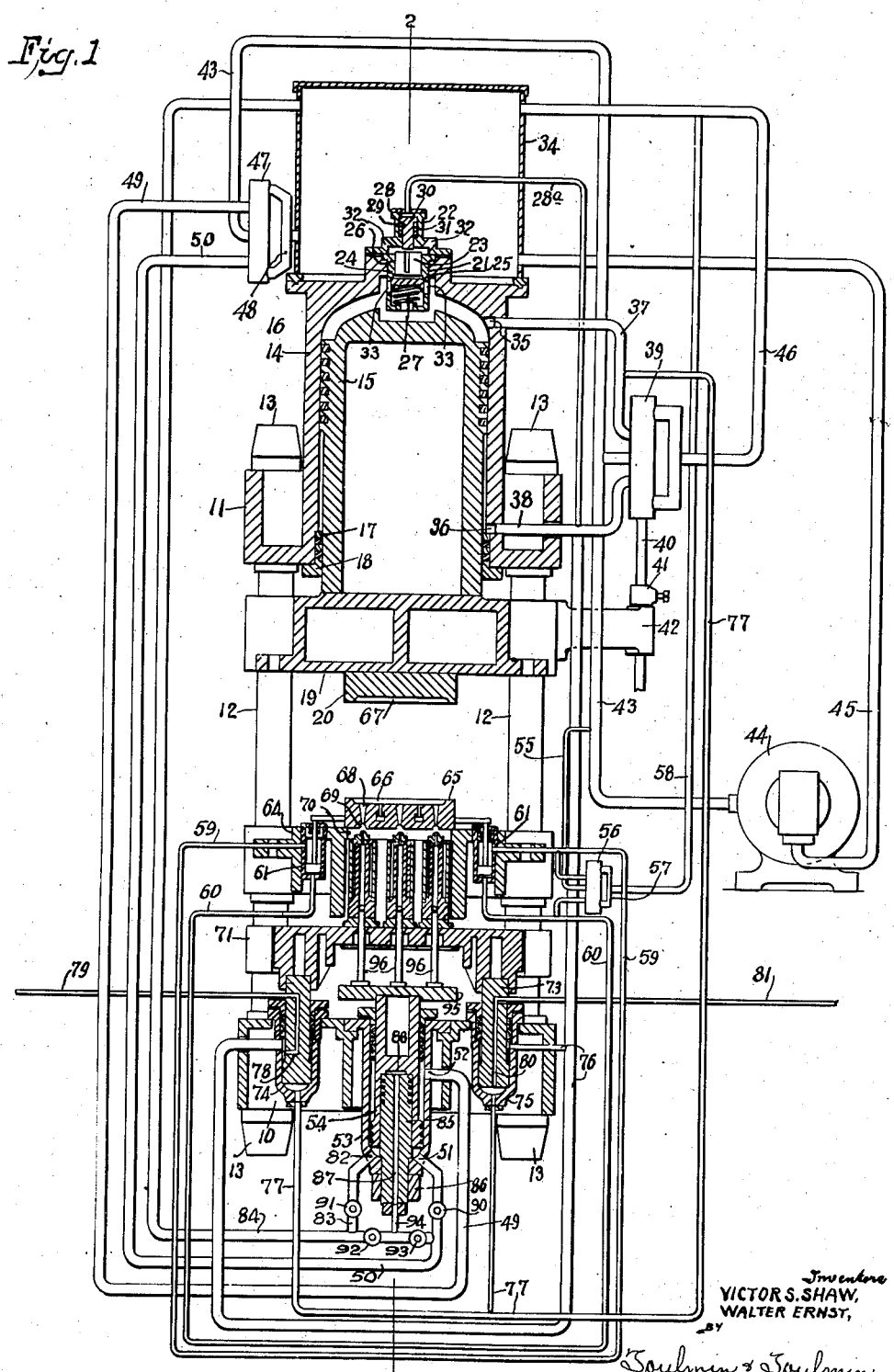
Figure 1 is a central vertical section through the extrusion molding press of this invention likewise showing the hydraulic circuit associated therewith, taken along the line I—I in Figure 2.
Figure 2:
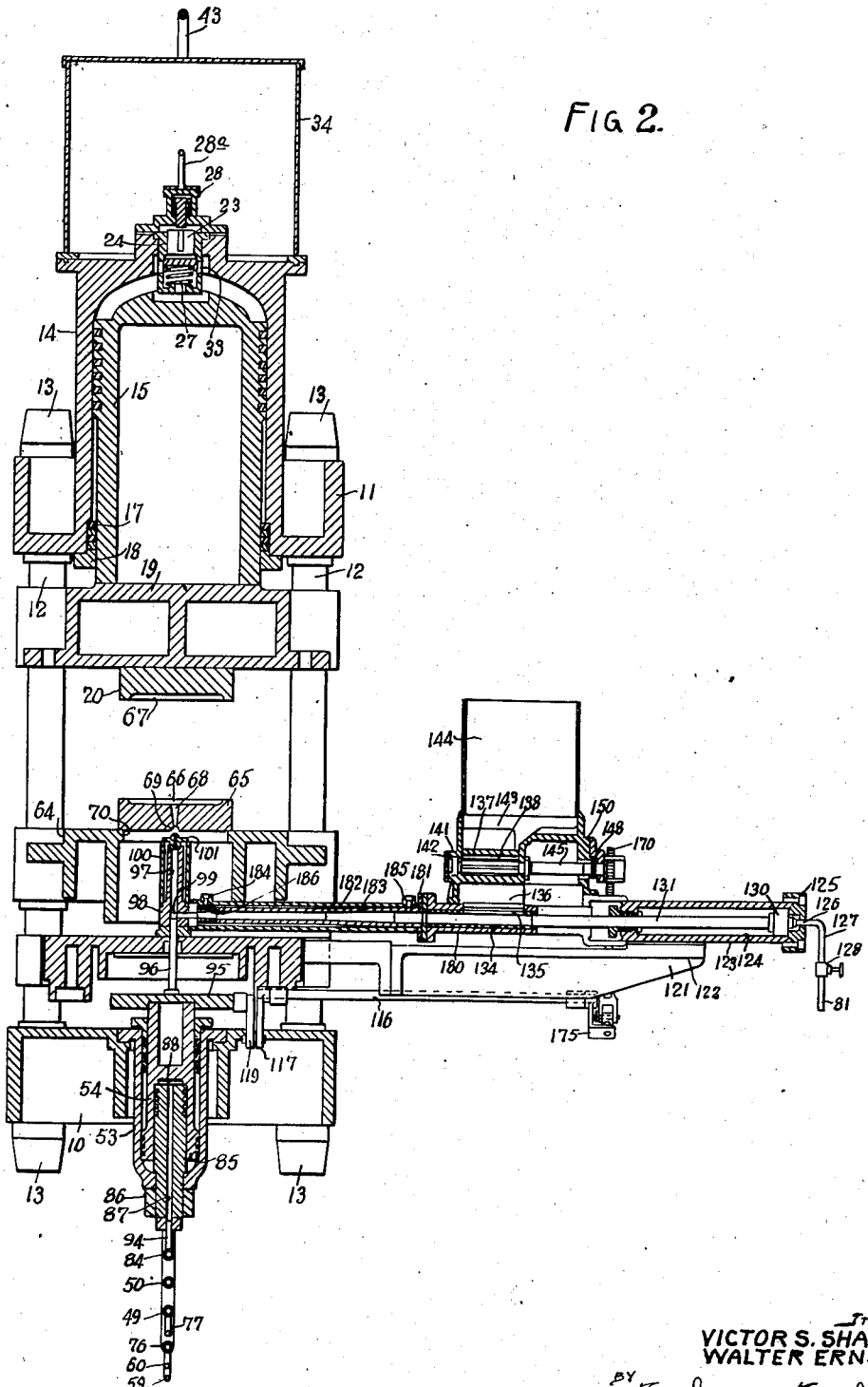
Figure 2 is a central vertical section through the press shown in Figure 1, but taken at right angles thereto along the line 2—2.

Referring to the drawings in detail, Figures 1 and 2 show the general construction of the plastic extrusion press and the feeding assembly associated therewith, together with the hydraulic circuit interconnecting the various elements. The hydraulic press consists of a base member 10 and a top member 11 interconnected by strain rods 12, these being held in place by nuts 13 on the ends thereof. The top member 11 is formed with a clamping cylinder 14 having a clamping ram 15 movable to and fro within the bore 16 thereof. Associated with the clamping ram 15 is a packing 17 and gland 18 for preventing the escape of fluid. Attached to the lower end of the clamping ram 15 is a die holder 19, upon which is mounted the upper half 20 of the die.

The clamping cylinder 14 is provided with a bore 21, in which is mounted a surge valve, generally designated 22, of the type described and claimed in the patent to Walter Ernst No. 1,- 892,568, dated December 27, 1932. The details of this surge valve in themselves form no part of the present invention. The surge valve 22 contains a vertically movable fluted valve member 23, having its lower portion 24 adapted to seat against a bevel portion 25 in the surge valve casing 26, the valve member 23 being urged upwardly in a closing direction by means of the spring 27.

A hydraulic cylinder 28, containing a bore 29 with a plunger 30 reciprocable therein and urged in one direction by a coil spring 31, is mounted over the casing 26 and in line with the valve member 23, the cylinder 28 containing ports 32 for the admission of fluid to the valve member 23. The casing 26 is provided with ports 33 for the passage of fluid to and from the lower portion 24 of the valve member 23. The purpose of this surge valve 22 is to permit the prefilling of the main cylinder during the gravitational descent of the clamping ram 15, thereby enabling a faster operation to be performed than would be the case if the pump alone were relied upon to advance the ram 15. The surge valve 22 is also double-acting, and the cylinder 28 provides means for automatically and forcibly opening the valve upon the reversal of the press so as to permit the fluid from the clamping cylinder bore 16 to escape directly into the surge tank 34 containing the supply of fluid for the operation of the press. The operation of the surge valve 22 is described below in more detail in connection with the general operation of the press.

Associated with the clamping cylinder bore 16 are ports 35 and 36 on opposite sides of the piston head of the clamping ram 15, and leading by way of the pipe lines 37 and 38, respectively, to a clamping control valve 39, the latter having a valve rod 40 which is operable either manually or automatically by means of an adjustable stop 41 actuated by engagement with an arm 42 attached to the die holder 19. From the valve 39 the pipe line 43 leads to the pressure side of a pump 44, the suction line 45 of which leads to the surge tank 34. From the end ports of the valve 39 the bifurcated pipe line 46 likewise leads to the surge tank 34. The pressure pipe line 43 also leads from the pump 44 to the central port of the injection control valve 47, arranged adjacent the surge tank 34, the valve 47 having its end ports connected to the surge tank 34 by means of the bifurcated pipe line 48. From the remaining ports of the injection control valve 47 the pipe lines 49 and 50 lead to ports 51 and 52 in the injection ram cylinder 53 on opposite sides of the double-acting injection ram 54.

From the pump pressure line 43 the line 55 leads to the central port of the knock-out control valve 56, the end ports of which are connected by the bifurcated pipe line 57 to the line 58 leading to the surge tank 34. The clamping control valve 39, the injection control valve 47 and the knock-out control valve 56 are conventional four-way, double-acting balanced piston valves, with the center inlet from the pump and two outlets to the opposite points of pressure application, and a manifold exhaust from the opposite extreme ends of the valve casing. Such valves are well known to those skilled in the art, and the details thereof form no part of the present invention. Any suitable valve which serves to distribute fluid to opposite points of application may be used in place of these valves without departing from the scope or spirit of this invention.

From the remaining ports of the knock-out control valve 56 the pipe lines 59 and 60 lead to the base and top ports, respectively, of the knock-out cylinders 61 on opposite sides of the knock-out rams 62. The outer ends of the knock-out rams 62 are interconnected by the knock-out rod 63, which serves to eject the work-piece from the dies in response to the operation of the knock-out control valve 56. The latter is manually operated, as are the clamping control valve 39 and the injection control valve 47. As previously mentioned, however, the clamping control valve 39 is additionally operable automatically by means of the arm 42 attached to the die holder 19. The knock-out cylinders 61 are mounted in a frame cross member 64, supported upon the strain rods 12 at a position between the base member 10 and top member 11. The intermediate cross member 64 serves to support the lower die half 65, having a half recess 66 aligned with the upper recess 67. Communication with the lower recess 66 is gained by means of passages 68 through the lower die half 65, these passages 68 terminating in sockets 69. The cross member 64 is provided with a central bore 70 immediately beneath the lower die half 65, and serving for the admission of the molding material injection apparatus, as described below.

The press is provided with an injection cylinder carrier 71, slidable to and fro at the lower part of the press and connected to the injector carrier rams 72 and 73 for this purpose. The injector carrier rams 72 and 73 are mounted for reciprocation in the injector carrier cylinders 74 and 75. The injector carrier rams 72 and 73 are double-acting and the return side thereof is connected by the pipe line 76 with the return line 38 of the clamping cylinder 14, as regulated by the clamping control valve 39. Similarly, the advancing sides of the injector carrier cylinders 74 and 75 are connected by the pipe lines 77 to the line 37 leading from the clamping cylinder 14 to the clamping control valve 39.

For the purpose of conveying fluid from the return side of the left-hand injector carrier ram 72, the latter is provided with a longitudinal bore 78 which terminates at its outer end in a pipe line 79. Similarly, the right-hand injector carrier ram 73 is provided with a longitudinal bore 80 leading from the advancing side thereof through the ram, and terminating in a pipe line 81. The pipe lines 79 and 81 lead to the feeding assembly for feeding the plastic molding material to the injection apparatus, as described below. The injection ram cylinder 53 is mounted in the base 10 of the press, and in addition to the head port 51, is provided with a head port 82 leading by way of the pipe lines 83 and 84 to the surge tank 34. The injection ram cylinder 53 is provided with a stationary fluid-distributing member 85, secured thereto by the member 86 and having a longitudinal bore 87 leading to an inner piston head area 88 in the injection ram 54, the annular end portion 89 of which serves as an outer piston head area. The head ports 51 and 82 communicate with the annular outer piston head 89, access thereto being controlled by the valves 90 and 91, respectively. Access to the inner piston head area 88, however, is controlled by the valves 92 and 93, arranged on opposite sides of the T-shaped pipe line 94 communicating with the longitudinal bore 87 in the fluid-distributing member 85. The other side of the valve 93 communicates with the line 50 leading to the injection control valve 47, whereas the remaining side of the valve 92 is connected to the pipe line 84 leading to the surge tank 34.

On the upper end of the injection ram 54 is mounted the injection plunger carrier member 95, having mounted thereon a plurality of injection plungers 96. These plungers 96 at their upper ends pass into bores 97 in the injection cylinders 98, access to the latter being gained through the ports 99 for the supplying of plastic molding materials. In order to maintain these molding materials in a plastic condition the injection cylinders 98 are surrounded by casings 100, forming heating jackets. These heating jackets may be heated either by the direct circulation of heated oil, by suitable electrical heating elements, or by other suitable heating means. The outer end of each injection cylinder 98 terminates in a nozzle 101, having its tip adapted to fit into the sockets 69 in which the passages 68 of the lower die half 65 terminate.

Figure 3:
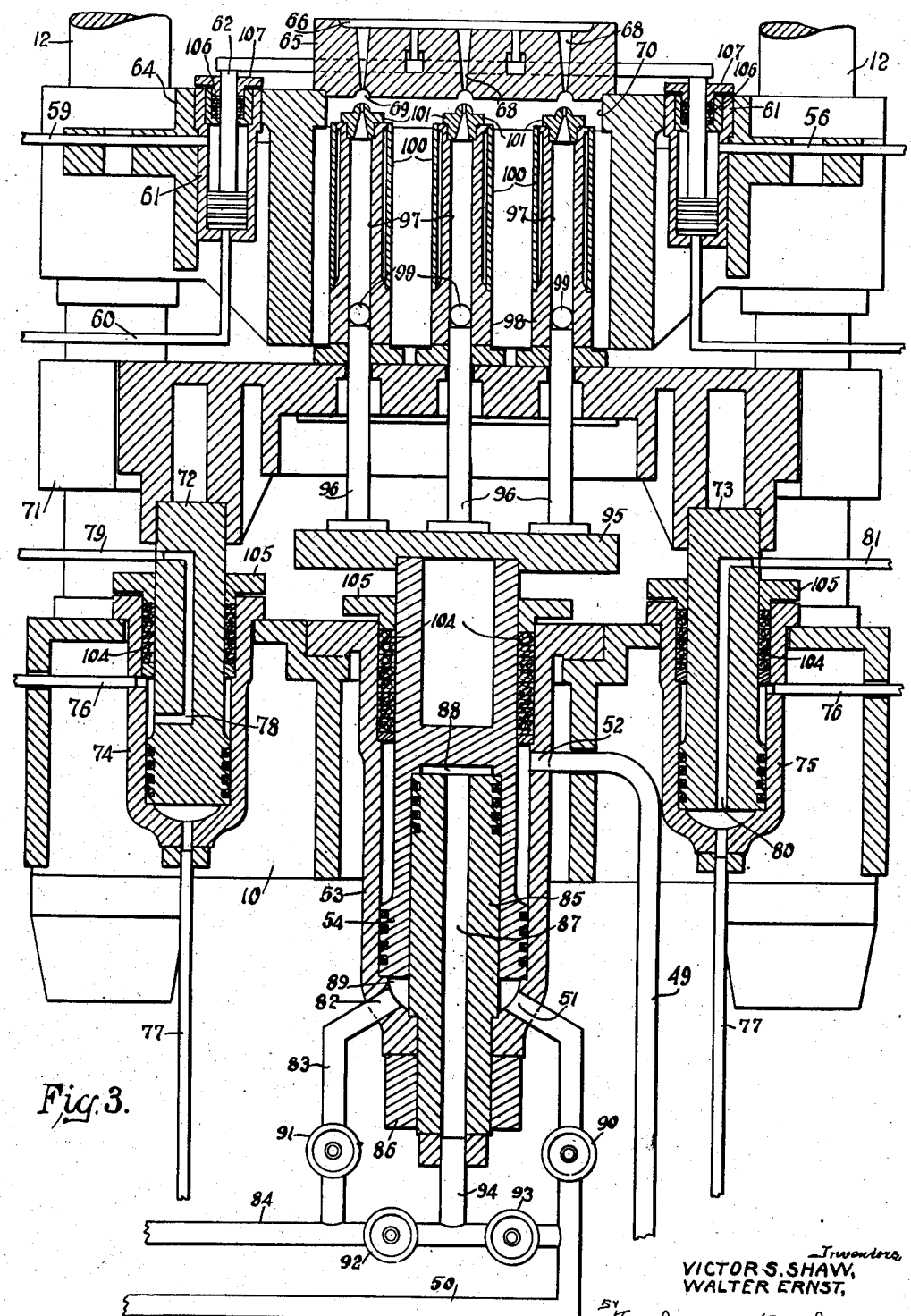
Figure 3 is an enlarged view of the mechanism shown in the lower half of Figure 1.

Leakage from the injection ram cylinder 53 and from the injection carrier cylinders 74 and 75 is prevented by the packings 104 and glands 105 (Figure 3). Surrounding the knock-out rams 62 are the packings 106 and glands 107, respectively.

*Feeding arrangement*

The feeding arrangement for feeding plastic material to the injection cylinders 98 is shown in Figures 2, 4 and 5. Attached to the injection cylinder carrier 71 is an arm 115, which rotatably supports a shaft 116 having a crank arm 117 secured to one end thereof. The crank arm 117 is connected by means of the pivot pin 118 to the link 119, the opposite end of which is pivotally anchored on the pivot pin 120 mounted in the injection plunger carrier member 95. By this arrangement the upward motion of the injection cylinder carrier 71 will cause the rotation of the shaft 116 and the consequent actuation of the feeding assembly, described below, because the injection plunger carrier member 95 is stationary at the time the injection cylinder carrier 71 is moved.

Mounted on the injection cylinder carrier 71 is a bracket 121, the outer end of which is provided with a machined portion 122 serving as a base for the mounting of the feeding assembly. The feeding assembly consists of a cylinder block 123 having a plurality of cylinder bores 124, with the ends thereof closed by a cylinder head 125 with ports 126 opening into the pipe lines 127 leading by way of the valves 128 to the pipe line 81 (Figures 4 and 5). At their left-hand ends the cylinder bores 124 are interconnected by the passageways 129, fluid being supplied to the left-hand ends of the cylinder bores 124 by means of the pipe line 79. Mounted for reciprocation in the cylinder bores 124 are double-acting rams 130, the piston rods 131 of which pass through packings 132 and glands 133 for the prevention of leakage. Beyond the glands 133 the piston rods 131 enter into the cylindrical receiving chambers 134, having elongated ports 135 in their upper sides communicating by way of the chutes 136 with the feeding chambers 137 containing the feeding wheels 138. The latter are mounted upon shafts 139 supported at opposite ends by anti-friction bearings 140, the left-hand anti-friction bearings being mounted in sleeves 141 held in position by the end plates 142 (Figure 4). Leading into the feeding chambers 137 are the hopper discharge portions 143 of the hopper 144.

The shafts 139 of the feeding wheels 138 are connected to shafts 145 mounted in anti-friction bearings 146 and 147, between which are arranged the gears 148. Between the gears 148 and meshing therewith are idler gears 149, serving to drivingly interconnect the feeding wheels 138 (Figure 5). The feeding wheels 138 and the shafts 139 and 145 therefor are mounted in a casting 150, a portion of which contains the lower parts 143 of the hopper 144. One of the gears 148 meshes with a driving gear 151 (Figure 5), mounted on the hub 152 of a ratchet 153 (Figure 6).

The ratchet 153 is engaged by a pawl 154 mounted upon the pin 155 which is seated in the periphery of a disc 156, mounted upon the hub 157 of a pinion 158. The pinion 158 and the ratchet hub 152 are mounted upon bearing bushings 159 and 160, respectively, these being supported upon the shaft 161 mounted at one end in the bore 162 of the bracket 163, the other end being similarly supported in a bore 164 and held in position by the nuts 165 on the threaded end 166 thereof. A spacing member 167 spaces the pinion 158 apart from the bracket 163, and at the opposite end of the shaft 161 the bracket 163 is provided with a boss 168 for spacing the hub 152 of the ratchet 153 apart from the bracket 163.

Arranged to engage and mesh with the pinion 158 is a rack 170 having its lower end pivotally mounted upon the pivot pin 171, secured to the adjustable clamp 172. The latter is slidably mounted upon the rod 173 and is adapted to be clamped in position at any desired point by turning the clamping screw 174. The rod 173 is mounted between the arms of the U-shaped crank 175, which is mounted upon the right-hand end of the rod 116 immediately adjacent the supporting bracket 176 attached to the bracket 121. As a consequence, the clamp 172 may be moved to and fro to vary the distance of the pivot pin 171 of the rack 170 from the rod 116, thereby varying the feeding movement which will be given to the feeding wheels 138 as the bracket 121 and the feeding assembly move upwardly.

The cylindrical receiving chambers 134 for the piston rods 131 are mounted in casings 180, which are spaced by the spacing members 181 from the heating casings 182 surrounding the heating tubes 183 and forming a heating jacket for the reception of heated oil which is distributed to and from the jacket by means of the connections 184 and 185 (Figure 4). The left-hand end of the heating tube 183 is provided with a bushing 186 which serves as a nozzle to direct plastic material through the ports 99 into the injection cylinders 98. The tips of the heating tubes 183 are arranged to fit into the ports 99, and are surrounded by annular members 187 engaging the walls of the injection cylinders 98 surrounding the ports 99.

Operation

In the operation of the plastic extrusion press of this invention, molding material is placed in the hopper 144 and passes downwardly through the portions 143 into the bores 137 containing the feeding wheels 138. As these feeding wheels are rotated by the mechanism previously described, through the agency of the rack 170, the material passes downwardly through the chutes 136 into the receiving chambers 134, whence it is fed by the plungers 131, in the manner previously described, into the heating tubes 183, and thence injected at the proper moment through the nozzles 186 and ports 99 into the injection cylinders 98. The operation of the rack 170 occurs in response to the rise of the injection cylinder carrier 71 and its associated bracket 121 in response to the urge of its pistons 72 and 73, in the manner subsequently described, while the injection plunger carrier member 95 remains temporarily stationary. The molding material within the heating tube 183 is maintained in a plastic condition by the heated oil passing through the casing 182 surrounding it.

Meanwhile, the operator has started the pump 44 and shifted the clamping control valve 39 into a position wherein pressure fluid is transmitted from the pipe line 43, through the valve 39, into the pipe line 37 leading to the port 35 in the head of the clamping cylinder 14. This causes the plunger 15 to move downwardly, and the speed thereof is accelerated by the action of the surge valve 22. As the plunger 15 moves downwardly its suction urges the valve member 23 downwardly, allowing fluid to pass through the passages 32 and 33 of the valve into the cylinders directly from the surge tank 34. In this manner the clamping plunger 15 moves downwardly at a rapid rate until the upper die member 67 engages the lower die member 65. When this occurs the pressure builds up within the cylinder bore 16 and immediately closes the surge valve 22, assisted by the urge of its spring 27.

The pressure fluid also passes from the line 37, along the lines 77 into the cylinders 74 and 75, urging the rams 72 and 73 upwardly and carrying with them the injection cylinder carrier 71. With this action the injection cylinders 98 are moved upwardly until their nozzles 101 engage the sockets 69 in the lower die member 65, causing a sealing engagement therebetween. The operator now actuates the injection control valve 47 to cause pressure fluid to pass therethrough into the line 50, the line 49 thereby becoming the return line. The injection ram 54 is now operated by admitting fluid either to engage the outer piston area 89 or the inner piston area 88, as determined by the adjustment of the valves 90 to 93, inclusive, thereby forcing the injection ram 54 upwardly and with it the injection plunger carrier member 95, causing the injector plungers 96 to move upwardly in their cylinder bores 97 and to force the plastic material through the nozzles 101 and the passages 68 into the recesses 66 and 67 of the two die members 20 and 65. The contents of the injector cylinders 98 are meanwhile maintained in a plastic condition by circulating heated oil through the interior of the casings 100 surrounding the cylinders 98.

If it is desired to utilize only the inner piston area 88 of the injection ram 54, the valves 90 and 92 are closed and the valves 91 and 93 are opened. In this manner pressure fluid passes from the pressure line 50, through the longitudinal bore 87 of the member 85 to act against the inner piston area 88. If, however, it is desired to employ only the outer piston area 89, the valves 90 and 92 are opened and the valves 93 and 91 are closed so that pressure fluid passes from the line 50 into the space surrounding the outer annular piston area 89. If it is desired to use both the inner area 88 and the outer area 89, the valves 90 and 93 are opened and the valves 92 and 91 are closed. In this manner the pressure with which the injection plungers 96 engage the plastic material may be varied without varying the pressure which the pump 44 delivers to the hydraulic circuit. This feature becomes valuable when it is desired to use a different die in the machine so that one or more of the injection cylinders 98 is added or removed, and the other cylinders rearranged according to the nature of the die. This enables three different pressure stages to be applied by altering the settings of the valves 90 to 93, respectively.

After the injection plungers 96 have injected the plastic material into the dies 65 and 20, and the material has cooled sufficiently, the mold is parted by shifting the clamping control valve 39 and causing pressure fluid to be discharged through the line 38 and the port 36, into the space beneath the head of the clamping ram 15. The latter moves upwardly and carries with it the upper die half 20, parting the mold. The ram 15 continues to move upwardly until its arm engages the stop 41 on the valve rod 40 and shifts the valve 39 to halt the upward motion of the ram 15. Meanwhile, the pressure fluid passing along the line 28a acts against the plunger 30 within the surge valve 22 and forcibly opens the surge valve, permitting the fluid to pass from the space above the ram 15 directly into the surge tank 34 through the surge valve 22.

The knock-out plungers 62 are now caused to move the knock-out rod 63 upwardly to eject the contents of the mold by shifting the knock-out control valve 56 to such a position that pressure fluid passes from the line 57, into the line 60 leading to the knock-out cylinders 61. Meanwhile, the feeding assembly shown in Figures 2 and 4 has been operated by the rotation of the rod 116, and the consequent motion of the rack 170 rotating the ratchet 153 and the gears 148 of the feeding wheels 138. The feeding rams 130 are operated by pressure fluid passing from the cylinder 75, through the drilled passage 80 in the plunger 73, thence along the line 81 and through the valves 128, lines 127 and ports 126 into the space at the ends of the cylinder bores 124. The pressure forces the rams 130 inwardly, causing the piston rods 131 to force the plastic material into the heating tubes 183. Any or all of the various heating tubes and cylinder bores may be temporarily placed out of action by closing any one of the valves 128. The fluid discharged from the opposite side of the ram 130 passes through the line 79, into the plunger 72 and through the drilled bore 78 thereof, into the return side of the cylinder 74, thence by the line 76 to the return side of the clamping control valve 39, and thence to the surge tank 34 through the line 46.

In this manner the feeding assembly shown in Figures 2 and 4 is hydraulically connected and operated without the use of swing joints or other means of flexible connection which are liable to leakage or wear. At the same time that pressure is admitted to return the clamping ram 15 to its upper position by shifting the clamping control valve 39, pressure is likewise admitted by the lines 76 to the cylinders 74 and 75, causing the rams 72 and 73 to move downwardly, disengaging the injection cylinders 98 and their nozzles 101 from engagement with the lower die member 65. The fluid discharged from the lower ends of the cylinders 74 and 75 returns through the line 77 to the surge tank 34 by way of the line 37, clamping control valve 39 and lines 46. Concurrently with this action, pressure fluid passes through the drilled passage 78 and line 79, into the space on the left-hand side of the feeding ram 130, causing it to move to the right into its retracted position. The fluid forced out of the right-hand end of each cylinder is returned through the lines 127, the valves 128, the line 81, the drilled bore 80 in the plunger 73, the cylinder 75, the lines 77, the line 37, the clamping control valve 39 and the line 46 to the surge tank 34.

In the embodiment shown in the drawings, the clamping control valve 39 and the injection control valve 47 are manually operated through an electrical arrangement with manual control. The knock-out control valve 56 is manually operated.

It will be understood that the injector cylinders 98 are not necessarily in one plane, but are so shown in the drawings for purposes of clarity. In practice, the cylinders 98 may be arranged in three-dimensional space, according to the positions most desirable for the passages 68 leading into the die. The injector cylinders 98 may also be rearranged in their positions upon the injection cylinder carrier 71, and the injector plungers 96 correspondingly rearranged upon the injection plunger carrier member 95, when different die halves 20 and 65 with differently located passages 68 are employed.

It will be understood that we desire to comprehend within this invention such modifications as come within the scope of the claims and the invention.

Having thus fully described our invention, what we claim as new and desire to secure by Letters Patent, is:

1. In combination in a molding press, a plurality of cooperating dies, one of said dies being movable into and out of engagement with the other die, devices connected to said movable die for moving said movable die into a closed position relatively to said other die, a movable injector adapted to inject molding material into said dies, fluid pressure means for discharging the contents of said injector, hydraulic ram means for moving said injector into engagement with one of said dies, and hydraulically-actuated means mounted to move with said injector and in communication therewith for supplying molding material to said injector, said ram means having passages therethrough communicating with said hydraulically-actuated material-supplying means.

2. In combination in a molding press, a plurality of cooperating dies, one of said dies being movable into and out of engagement with the other die, devices connected to said movable die for moving said movable die into a closed position relatively to said other die, a movable injector adapted to inject molding material into said dies, fluid pressure means for discharging the contents of said injector, means mounted to move with said injector and in communication therewith for supplying molding material to said injector, and a pair of hydraulic rams for moving said injector into engagement with one of said dies, one of said rams having a passage therethrough communicating with one part of said material-supplying means and the other ram having a passage therethrough for conducting fluid to another part of said material-supplying means.

3. In combination in a molding press, a plurality of cooperating dies, one of said dies being movable into and out of engagement with the other die, devices connected to said movable die for moving said movable die into a closed position relatively to said other die, a movable injector adapted to inject molding material into said dies, fluid pressure means for discharging the contents of said injector, means mounted to move with said injector and in communication therewith for supplying molding material to said injector, and a pair of double-acting rams having advancing and retracting chambers and arranged to move said injector into and out of engagement with one of said dies, one of said rams having a passage therethrough from the advancing chamber of said ram communicating with one part of said material-supplying means and the other ram having a passage therethrough from the retracting chamber of said ram for conducting pressure fluid to another part of said material-supplying means.

4. In combination in a molding press, movable die means, devices connected to said die means for moving said die means into a closed position, a movable injector adapted to inject molding material into said die means, means for moving said injector, and fluid-actuated motor means for discharging the contents of said injector, said means having a plurality of motor elements adapted to selectively impart a plurality of different injecting pressures to said injector.

5. In combination in a molding press, movable die means, devices connected to said die means for moving said die means into a closed position, a movable injector adapted to inject molding material into said die means, means for moving said injector, and a hydraulic plunger for operating said injector having a plurality of plunger areas for selectively imparting different injecting pressures to said injector.

6. In combination in a molding press, movable die means, devices connected to said die means for moving said die means into a closed position, a movable injector adapted to inject molding material into said die means, means for moving said injector, a hydraulic plunger for operating said injector having a plurality of plunger areas for selectively imparting different injecting pressures to said injector, and valve means for selecting the plunger area to be used for said injection.

7. In combination in a molding press, a plurality of cooperating dies, one of said dies being movable into and out of engagement with the other die, a vertically movable plunger connected to said movable die for moving said movable die into a closed position relatively to said other die, a vertically movable injector adapted to inject molding material into said dies, fluid pressure means for discharging the contents of said injector, separate means for moving said injector vertically into engagement with one of said dies, fluid-actuated material-supplying means mounted for motion with said injector and in communication therewith for supplying molding materials to said injector, and measuring means associated with said material-supplying means and operated by movement of said injector for automatically measuring out charges of molding materials for said material-supplying means.

8. In combination in a molding press, a plurality of cooperating dies, one of said dies being movable into and out of engagement with the other die, a vertically movable plunger connected to said movable die for moving said movable die into a closed position relatively to said other die, a vertically movable injector adapted to inject molding material into said dies, fluid pressure means for discharging the contents of said injector, separate means for moving said injector vertically into engagement with one of said dies, fluid-actuated material-supplying means mounted for motion with said injector and in communication therewith for supplying molding materials to said injector, measuring means associated with said material-supplying means and operated by said injector moving means for automatically measuring out charges of molding materials for said material-supplying means, and means for adjustably varying the amount of charge so measured.

9. In combination in a molding press, a frame, a plurality of cooperating dies, one of said dies being movable into and out of engagement with the other die, a vertically movable plunger connected to said movable die for moving said movable die into a closed position relatively to said other die, a vertically movable injector adapted to inject molding material into said dies, fluid pressure means for discharging the contents of said injector, means for moving said injector vertically into engagement with one of said dies, fluid-actuated material-supplying means mounted for motion with said injector and in communication therewith for supplying molding materials to said injector, measuring means associated with said material-supplying means for measuring out charges of molding materials for said material-supplying means, and means interconnecting said measuring means and said frame for operating said measuring means in response to the motion of said material-supplying means relatively thereto.

10. In combination in a molding press, a frame, a plurality of cooperating dies, one of said dies being movable into and out of engagement with the other die, a vertically movable plunger connected to said movable die for moving said movable die into a closed position relatively to said other die, a vertically movable injector adapted to inject molding material into said dies, fluid pressure means for discharging the contents of said injector, a supporting member for said injector, a hydraulic plunger for moving said supporting member and said injector into engagement with one of said dies, a fluid actuated material-feeding cylinder and piston assembly connected to said supporting member and in communication with said injector for motion therewith, a measuring device associated with said feeding assembly for measuring out charges of molding material therefor, and mechanism associated with said measuring device and responsive to the amount of motion of said supporting member for determining the amount of charge so measured.

11. In combination in a molding press, a plurality of cooperating dies, one of said dies being movable into and out of engagement with the other die, devices connected to said movable die for moving said movable die into a closed position relative to said other die, a movable injector adapted to inject molding material into said dies, fluid pressure means for discharging the contents of said injector, a double-acting hydraulic feeding plunger mounted to move with said injector, a feeding cylinder connected to said injector and containing a reciprocable feeding member for supplying molding material from said feeding cylinder to said injector, and a pair of double-acting hydraulic rams for moving said injector into engagement with one of said dies, said rams having passages therethrough communicating with the opposite sides of said feeding plunger for conducting fluid therebetween.

12. In combination in a molding press, a die, an injector movable into engagement with said die for injecting molding materials therein, fluid pressure means for discharging the contents of said injector, a hydraulic feeding plunger mounted for movement with said injector, a feeding cylinder connected to said injector and containing a reciprocable feeding member for supplying molding material from said feeding cylinder to said injector, and a plurality of hydraulic plungers for moving said injector, one of said injector-moving plungers having fluid conducting means extending therethrough from one side thereof to one side of said feeding plunger and the other of said injector-moving plungers having fluid conducting means extending therethrough from the other side thereof to the other side of said feeding plunger.

13. In combination in a molding press, a die, an injector movable into engagement with said die for injecting molding materials therein, fluid pressure means for discharging the contents of said injector, a hydraulic feeding plunger mounted for movement with said injector, a feeding cylinder connected to said injector and containing a reciprocable feeding member for supplying molding materials from said feeding cylinder to said injector, a plurality of hydraulic plungers for moving said injector, and hydraulic cylinders for said plungers, one of said injector-moving plungers having fluid conducting means extending therethrough from the plunger advancing chamber of said cylinder to one side of said feeding plunger and the other of said injector-moving plungers having fluid conducting means extending therethrough from the plunger retracting side of its cylinder to the other side of said feeding plunger.

14. In combination in a molding press, a die, an injector movable into engagement with said die for injecting molding materials therein, fluid pressure means for discharging the contents of said injector, a hydraulic feeding plunger mounted for movement with said injector, a feeding cylinder connected to said injector and containing a reciprocable feeding member for supplying molding material from said feeding cylinder to said injector, a plurality of hydraulic plungers for moving said injector, one of said injector-moving plungers having fluid conducting means extending therethrough from one side thereof to one side of said feeding plunger and the other of said injector-moving plungers having fluid conducting means extending therethrough from the other side thereof to the other side of said feeding plungers, and measuring means responsive to the motion of said injector for measuring out and delivering materials to said feeding cylinder.

15. In combination in a molding press, a die, an injector movable into engagement with said die for injecting molding materials therein, fluid pressure means for discharging the contents of said injector, a hydraulic feeding plunger mounted for movement with said injector, a feeding cylinder connected to said injector and containing a reciprocable feeding member for supplying molding material from said feeding cylinder to said injector, a plurality of hydraulic plungers for moving said injector, one of said injector-moving plungers having fluid conducting means extending therethrough from one side thereof to one side of said feeding plunger and the other of said injector-moving plungers having fluid conducting means extending therethrough from the other side thereof to the other side of said feeding plunger, and measuring means responsive to the motion of said injector for measuring out and delivering materials to said feeding cylinder, said measuring means being adapted to be actuated in one direction of motion only of said injector.

16. In combination in a molding press, a plurality of cooperating dies, one of said dies being movable into and out of engagement with the other die, a vertically movable plunger connected for moving said movable die into a closed position relative to the other die, a vertically movable injector adapted to inject molding material into said dies, fluid pressure operable injector means for discharging the contents of said injector, separate means for moving said injector vertically into engagement with one of said dies, fluid actuated material supplying means mounted for motion with said injector, a feeding cylinder connected to said injector and containing a reciprocable feeding member for supplying molding material from said feeding cylinder to said injector and having its longitudinal axis substantially at right angles to the direction of movement of said injector, and measuring means associated with said material-supplying means and comprising a rack and gear system adapted to be operated by movement of said injector relative to said fluid pressure operable injector means, means being provided for allowing operation of said measuring means in one direction only of said injector.

17. In combination in a molding press, a frame, a plurality of cooperating dies, one of said dies being movable into and out of engagement with the other die, a vertically movable plunger connected to said movable die for moving said movable die into closed position relatively to said other die, a vertically movable injector adapted to inject molding material into said dies, fluid pressure means for discharging the contents of said injector, a supporting member for said injector, a hydraulic plunger for moving said supporting member and said injector into engagement with one of said dies, a fluid actuated material feeding and piston assembly connected to said supporting member for motion therewith, said feeding cylinder being arranged substantially at right angles with respect to the direction of movement of said injector and being adapted to communicate with said injector so as to allow transfer of molding material from said feeding cylinder to said injector by movement of said feeding piston, a measuring device associated with said feeding assembly for measuring out charges of molding material therefor, and means interconnecting said measuring device in response to the motion of said material feeding cylinder and piston assembly relative to said frame.

VICTOR S. SHAW.
WALTER ERNST.